J. W. STAHL.
TONGUE SUPPORT.
APPLICATION FILED FEB. 16, 1909.
1,008,749.
Patented Nov. 14, 1911.
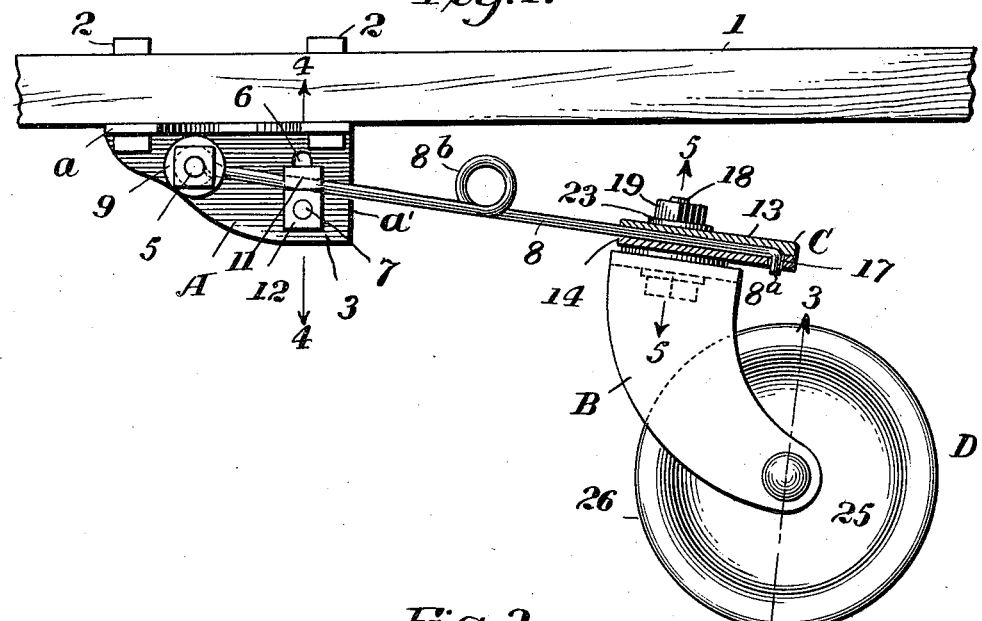
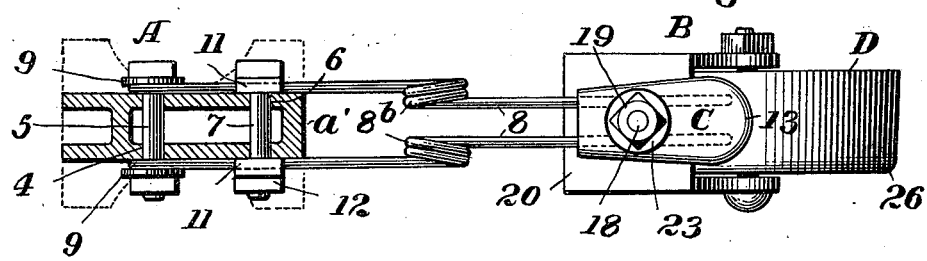
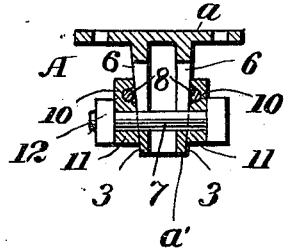
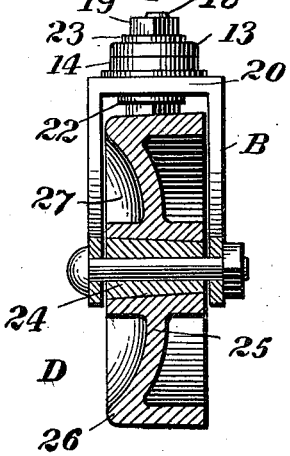
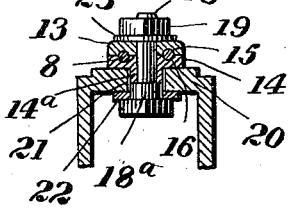
Witnesses
J. G. Stinkel
Edw. F. Janke
Inventor
John W. Stahl
By C. W. Clement
Attorney

UNITED STATES PATENT OFFICE.

JOHN W. STAHL, OF UNION TOWNSHIP, SNYDER COUNTY, PENNSYLVANIA, ASSIGNOR OF ONE-HALF TO BENJAMIN STAHL, OF UNION TOWNSHIP, PENNSYLVANIA.

TONGUE-SUPPORT.

1,008,749.  Specification of Letters Patent.  Patented Nov. 14, 1911.

Application filed February 16, 1909. Serial No. 478,318.

*To all whom it may concern:*

Be it known that I, JOHN W. STAHL, citizen of the United States, residing in Union township, in the county of Snyder and State of Pennsylvania, have invented new and useful Improvements in Tongue-Supports, of which the following is a specification.

My invention comprises certain improvements in tongue supports for harvesters and other agricultural machinery, the details of which will be pointed out in the following specification taken in connection with the accompanying drawing, in which, Figure 1 is a side elevation of the tongue support, and a part of the tongue; Fig. 2 is a top plan view of the tongue support, the web being shown in horizontal section; Fig. 3 is a section on the line 3—3 of Fig. 1; Fig. 4 is a section on the line 4—4 of Fig. 1; and, Fig. 5 is a section on the line 5—5 of Fig. 1.

Referring to the drawing, 1 indicates the tongue of a harvesting machine or other agricultural machine to the under side of which is attached, by bolts 2, a metal fixture A. The fixture A comprises a plate $a$ fitting against the under side of the tongue and secured to the same by the bolts 2, and a web $a'$, preferably made hollow, and extending downwardly from said plate. The outer sides 3 of the web converge downwardly, giving the web a wedge shape. The web $a'$ has, near its forward end, a bolt hole 4 through which extends a fastening bolt 5, and near its rear end the web has a vertical slot 6 in which is arranged an adjusting bolt 7. A pair of similar spring arms 8 have their forward ends coiled around the bolt 5 and clamped by the bolt between the washers 9 and the sides of the web. These spring arms extend through recesses 10 in washers 11 upon the bolt 7 and a nut 12 upon said latter bolt serves as a means for clamping the spring arms between these grooved washers and the web $a'$.

The rear ends of the spring arms 8 are secured to a yoke B by means of a clamp C and a supporting wheel D is mounted between the arms or forks of the yoke. The clamp C comprises two clamping plates 13 and 14 having opposed grooves 15 and 16 adapted to receive the rear portions of the spring arms 8. The clamping plate 14 has perforations 17 at the rear ends of the groove 16, and the extremities $8^a$ of the spring arms are bent over at right angles to the main portions of said arms and extend into the perforations 17, thereby locking the spring arms to the clamp when the plates are pressed together. The clamp is pivotally secured to the yoke B by a bolt 18 and nut 19, which also serve as means for pressing the two clamping plates together. As shown in the drawing, the top plate 20 of the yoke has a central opening 21 and the lower clamping plate 14 has a boss $14^a$ which extends into said opening. The bolt 18 passes through said boss and has a shoulder $18^a$ which abuts against the boss $14^a$. A washer 22 is arranged between the head of the bolt and the top of the yoke, and a washer 23 is arranged between the nut 19 and the upper clamping plate 13. When the nut 19 is tightened the clamping plates are pressed toward one another and grip the spring arms, and the shoulder $18^a$ abuts against the boss $14^a$. Thus the clamping members are held securely together, but the yoke is free to turn about the pivot pin or bolt 18.

The coils $8^b$ of the spring arms are preferably arranged about half way between the bolt 7 and the clamp C. By adjusting the bolt 7 in the slot 6 the tongue may be supported at different heights. The spring arms exert a constant upward pressure upon the grooved washers 11 and the bolt 7, but, owing to the wedge form of the web $a'$, the bolt cannot slide upward in the slot 6 and this upward pressure on the washers and the bolt simply causes the spring arms to be gripped more tightly between the washers and the wedge. When the bolt is set in any given position, it cannot move upward except by loosening the nut upon the bolt. The over-turned ends $8^a$ of the spring arms prevent said arms from being drawn out of the clamp C and afford a positive locking connection between the clamp and the spring arms.

The wheel D is provided with a removable bushing 24, which is preferably made tapering as shown in Fig. 3. The wheel is preferably made with a solid web 25, instead of with spokes, in order to prevent the wheel from picking up dirt, sticks, etc., and at the point 26 where the web connects with the tread of the wheel the edge of the tread is rounded as shown. The tread of the wheel is slightly conical, and, for use on hillsides, the wheel may be turned so that the rounded edge 26 of the tread will be on the up-hill side of the machine and this rounded edge will prevent the wheel from cutting into the soil. The up-hill side of the web 25 is dished, as shown at 27, so that the wheel cannot pick up and retain dirt, sticks, etc.

What I claim is:—

1. The combination with a tongue and a supporting wheel-yoke, of a web secured to said tongue and having downwardly converging sides, spring arms having their rear ends connected to said yoke and having their forward ends secured at opposite sides of said web, and means for clamping said arms against the sides of the web near said forward ends.

2. The combination with a tongue and a supporting wheel-yoke, of a web secured to said tongue and having downwardly converging sides, spring arms for connecting said yoke to said web, said arms extending at opposite sides of the web, means for securing the forward ends of said arms to the web, and vertically adjustable clamping means, at the rear of said securing means, for clamping said arms against the sides of the web.

3. The combination with a tongue and a supporting wheel-yoke, of a web secured to said tongue and having downwardly converging sides, spring arms for connecting said yoke to said web, said arms extending at opposite sides of the web, a fastening bolt passing through the web and connected to said arms, said web having a vertical slot at the rear of said fastening bolt, a clamping bolt extending through said slot, and washers on said latter bolt having grooves adapted to engage the arms.

4. The combination with a tongue, a pair of spring arms, and means for connecting said arms with the tongue, of a pair of grooved clamping plates engaging the rear end portions of said arms, a wheel-yoke, and a pivot bolt extending through the top of said yoke and through said clamping plates, said bolt securing the plates together and to the yoke.

5. The combination with a tongue, a pair of spring arms, having their rear ends bent over to form hooks, and means for connecting the forward ends of said arms with the tongue, of a wheel-yoke, a pivot bolt extending through the top of said yoke, upper and lower clamping plates mounted on said bolt, said plates having opposed grooves adapted to receive the end portions of the spring arms, and said lower plate having perforations adapted to receive the hooked ends of said arms.

In testimony whereof I affix my signature, in presence of two subscribing witnesses.

JOHN W. STAHL.

Witnesses:
C. W. CLEMENT,
C. F. SHIPMAN.

Copies of this patent may be obtained for five cents each, by addressing the "Commissioner of Patents, Washington, D. C."